July 16, 1963 J. HARRIS 3,097,431
DENTAL ARTICULATOR FOR BRIDGEWORK AND CROWNS
Filed June 11, 1962 2 Sheets-Sheet 1
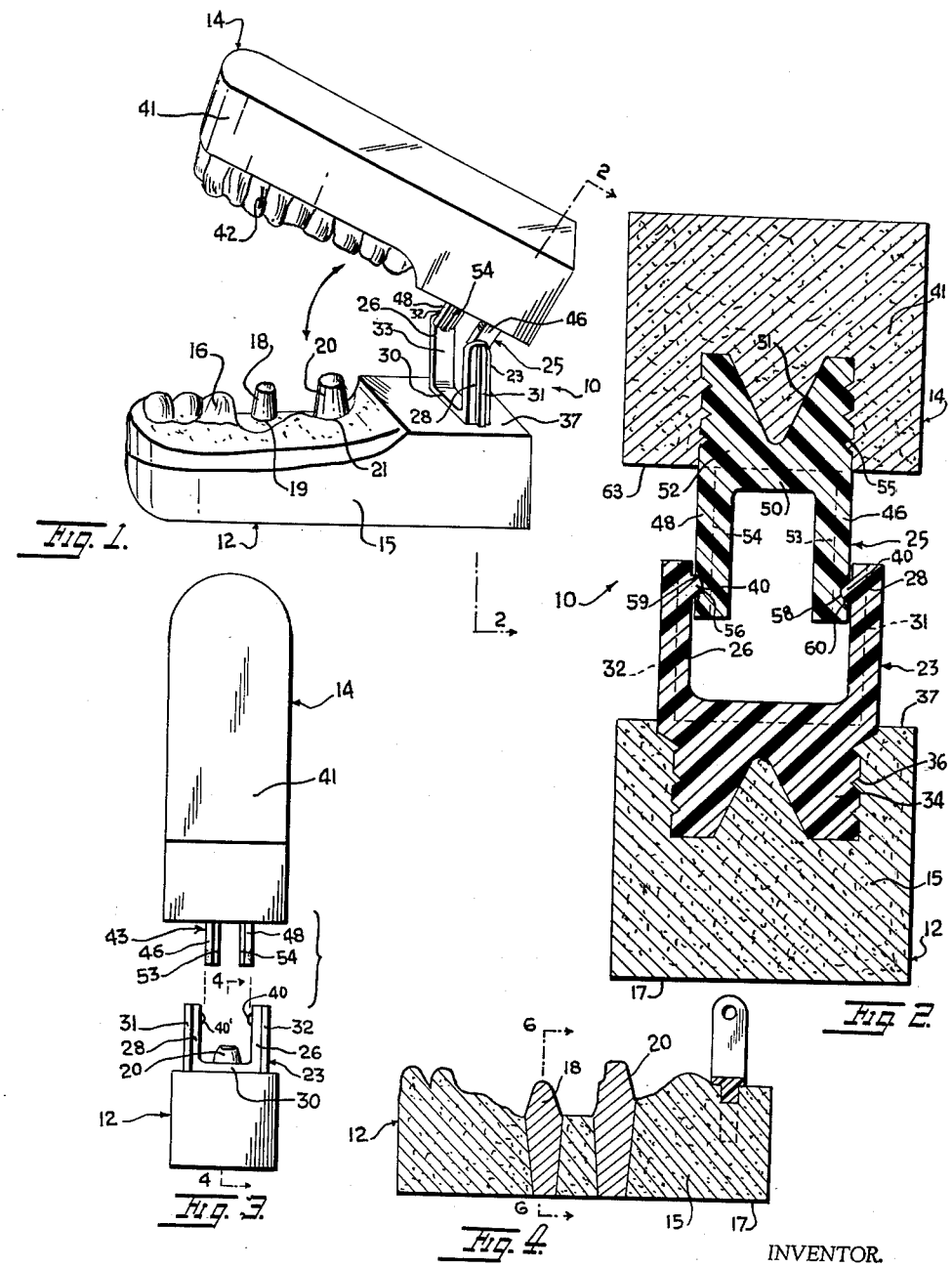
INVENTOR.
JESSE HARRIS
BY
ATTORNEY July 16, 1963 J. HARRIS 3,097,431
DENTAL ARTICULATOR FOR BRIDGEWORK AND CROWNS
Filed June 11, 1962 2 Sheets-Sheet 2

INVENTOR.
JESSE HARRIS
BY
ATTORNEY

United States Patent Office 3,097,431
Patented July 16, 1963

3,097,431
DENTAL ARTICULATOR FOR BRIDGEWORK
AND CROWNS
Jesse Harris, 94—05 Linden Blvd., Ozone Park, N.Y.
Filed June 11, 1962, Ser. No. 201,395
8 Claims. (Cl. 32—32)

This invention concerns an improved dental articulator.

One object of the invention is to provide a simple efficient articulator for partial bridge or plate work, as well as for full dentures.

A further object is to provide an articulator device including molded mandible and maxilla parts separably connected by a plastic joint and arranged to simulate bite movements, and in which condylar action thereof simulates anatomical condylar action.

Another object is to provide an articulator of the character described including cast portions having recesses formed by removable model teeth.

Still another object is to provide an articulator having mandible and maxilla parts capable of simulated anatomical movements in all directions including lateral, occlusal, opening, closing, forward and backward relative movements.

A still further object is to provide an articulator of simplified, more economical structure to facilitate fitting and construction of artificial dentures.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a lateral perspective view of the articulator in partially open position.

FIG. 2 is a sectional view on an enlarged scale taken on line 2—2 of FIG. 1.

FIG. 3 is an exploded rear view of parts of the articulator.

FIG. 4 is a sectional view of the mandible portion of the articulator taken on line 4—4 of FIG. 3.

Figure 5:
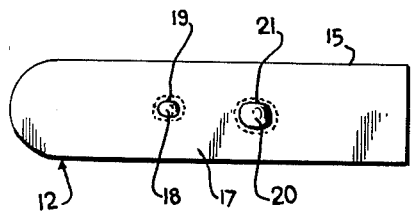
FIG. 5 is a bottom plan view of the mandible portion of the articulator.
Figure 6:
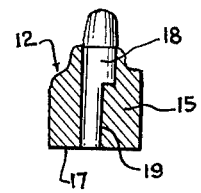
FIG. 6 is a sectional view taken on line 6—6 of FIG. 4.

Referring to the drawings, there is shown in FIGS. 1–6 a dental articulator 10 including a lower mandible portion 12 and an upper maxilla portion 14. The mandible portion includes a stone 15 consisting of a block of rigid set plaster, plastic or other composition material. This stone is formed by conventional dental casting procedures from a cast taken of a part of a patient's lower denture. Teeth 16 shown in the drawing are duplicates of the patient's own teeth. Plugs 18 and 20 are removable metal members which are to be replaced by artificial teeth to be supplied in an artificial denture or bridge to be fitted to the patient. These plugs are removably seated in tapered recesses 19, 21 shown to best advantage in FIGS. 4–6. The recesses 19, 21 are open at their lower ends at the flat bottom 17 of stone 15 to expose the narrow bottom ends of the plugs. By pushing upwardly on the bottom ends of the plugs with a suitable tool, the plugs can be released from the stone for fitting of suitable artificial teeth in the recesses.

Figure 7:
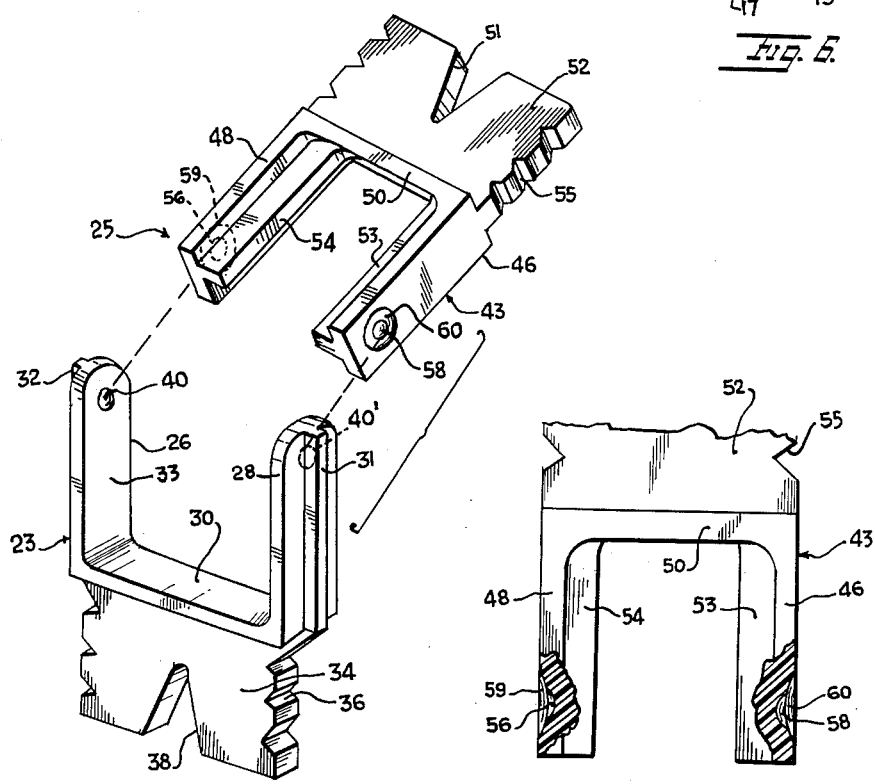
FIG. 7 is an exploded perspective view on an enlarged scale of parts of the articulator joint.

At the rear end of the stone 15 is the lower member 23 of an articulator joint 25. This member 23 is best shown in FIGS. 1–4 and 7. Member 23 is a rectangular U-shaped fork-like frame with upstanding straight arms 26, 28 and a flat, straight bight 30. Ribs 31, 32 extend outwardly of the outer sides of arms 26, 28 and extend longitudinally from the upper rounded ends of the arms down to the bight. The ribs are integral with a central generally rectangular flat depending tang 34. This tang has V-shaped notches 36 formed in its lateral edges and a deep inverted V-shaped notch 38 extending upwardly at its bottom end. The tang extends outwardly of the underside of bight 30.

Joint member 23 is securely seated on the stone with tang 34 embedded in the stone and with the arms and ribs of the joint member extending upwardly from the stone. The bight 30 is seated on the top surface 37 of the stone or is slightly embedded therein. On the inner sides 33 of the arms near their upper ends are hemispherical knobs 40, 40' facing each other in axial alignment, parallel to the flat bight 30. The notches 36, 38 insure permanent seating of the tang in the stone by receiving and engaging stone portions.

Figure 8:
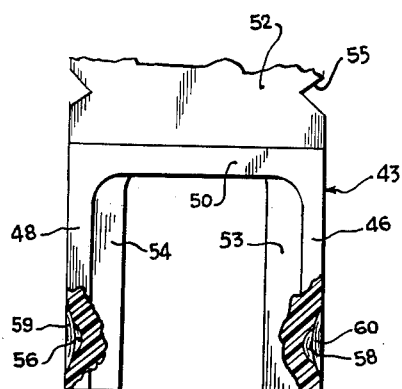
FIG. 8 is a fragmentary front elevational view partially in section of one part of the articulator joint.

The upper maxilla portion 14 of the articulator 10 includes a stone 41 formed of a block of rigid set plaster, plastic or other composition material, like that of stone 15. Stone 41 is formed by conventional dental casting procedures from a cast taken of a patient's upper denture. Teeth 42 shown in the drawing are composition, molded duplicates of the patient's existing teeth. At the rear end of the stone 41 is another articulator joint member 43 best shown in FIGS. 1–4, 7 and 8. Member 43 is a rectangular U-shaped fork-like frame with depending straight arms 46, 48 and a straight flat bight 50. Two stiffening ribs 53, 54 extend inwardly of the frame longitudinally of the inner sides of arms 46, 48 from the free ends to the bight 50. The member 43 has a flat generally rectangular tang 52 extending outwardly of bight 50. Notches 55 are formed in outer edges of the tang and a deep V-shaped notch 51 is formed in the free end of the tang. Tang 52 is embedded in the stone 41. The arms 46, 48 and bight 50 extend outwardly of the underside 63 of the stone. On outer sides of arms 46, 48 near their free ends are two spherically curved recesses 56, 58 which serve as sockets rotatably receiving knobs 40, 40', respectively. The recesses 56, 58 are centrally located within spherically curved recesses 59, 60. Recesses 59, 60 are shallower than recesses 56, 58 and are larger in diameter.

The articulator joint members 23 and 43 are both preferably formed of a smooth plastic material such as nylon. This material is slightly flexible so that the arms 26, 28 and 46, 48 can twist and bend slightly. This permits the mandible and maxilla portions of the articulator to be twisted laterally while engagement is maintained between the knobs of member 23 and recesses of member 43 to simulate lateral movements of a patient's lower jaw with respect to his upper jaw. Furthermore, the knobs 40, 40' can slip partially out of recesses 56, 58 and engage rotatably in recesses 59, 60 due to flexibility of the arms, when the portions of the articulator are brought together to simulate anatomical condylar action and anatomical bite movements. Since the recesses 59, 60 are concentric wtih inner recesses 56, 58 the knobs 40, 40' can move arcuately around the center recesses 56, 58 or can move up and down, and forwardly and rearwardly in recesses 59, 60. To simulate lateral movement of a lower jaw, one of knobs 40, 40' can move forwardly out of one center recess 56, 58 into recess 59 or 60 while the other knob moves rearwardly out of the center recess into the other recess 59 or 60.

The smooth plastic material has a self-lubricating characteristic so that no lubrication is required. The plastic material does not corrode and is resistant to chemicals used in artificial denture fabrication. The tough plastic material can withstand much rough handling, steam sterilization and repeated stresses without adverse effects. The joint members 23, 43 are readily engaged by inserting one of knobs 40, 40' into one recess 56 or 58 and then snapping the other knob into the other of recesses 56, 58. The joint members can be disengaged by a slight twisting movement of the articulator portions 12, 14 with respect to each, while the arms of the joint members flex to release the knobs.

It will be noted that the individual joint members are of one-piece construction and can be fabricated by well known plastic molding methods and machinery at very low cost. The joint members are inserted by the dentist or dental laboratory technician in the articulator stones while the material of the stones is semifluid and unset. After the material of the stones has set to rigid, inflexible form the tangs 34, 52 of the joint members are securely and permanently locked in the stones.

The invention makes it possible to construct a dental articulator of simplified structure at lower cost than has hitherto been possible. The articulator is capable of a full range of simulated bite movements. The several portions are freely pivoted or hinged together so that they can be pivoted apart more than 90° to provide unobstructed access to all parts of the upper and lower portions 12, 14 for fitting of dentures thereto.

The invention as illustrated is embodied in an articulator for constructing partial artificial dentures. The articulator can, of course, be arranged for full dentures with the same basic construction as described.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new and desire to secure by United States Letters Patent is:

1. A dental articulator, comprising mandibular and maxillary stones each composed of rigid, set materail, at least one of said stones having a tapered passage extending therethrough from one side to the other thereof for removably receiving a model of an artificial tooth, a first articulator joint member secured in one end of one of the stones, a second articulator joint member secured in one end of the other of said stones, the first joint member having a pair of straight parallel arms extending upwardly from the one stone with spherically curved knobs extending toward each other in axial alignment on opposing inner sides of the arms respectively, the second joint member having another of straight parallel arms extending downwardly from the other stone, said other arms having first recesses on outer sides thereof rotatably receiving the respective knobs, said other arms having other recesses concentric with the first recesses and shallower than the first recesses to engage the knobs when the stones are turned and twisted with respect to each other to simulate anatomical bite movements.

2. A dental articulator, comprising mandibular and maxillary stones each composed of rigid, set material, at least one of said stones having a tapered passage extending therethrough from one side to the other thereof for removably receiving a model of an artificial tooth, a first articulator joint member secured in one end of one of the stones, a second articulator joint member secured in one end of the other of said stones, the first joint member having a pair of straight parallel arms extending upwardly from the one stone with spherically curved knobs extending toward each other in axial alignment on opposing inner sides of the arms respectively, the second joint member having another pair of straight parallel arms extending downwardly from the other stone, said other arms having first recesses on outer sides thereof rotatably reeciving the respective knobs, said toher arms having other recesses concentric with the first recesses and shallower than the first recesses to engage the knobs when the stones are turned and twisted with respect to each other to simulate anatomical bit movements, said joint members being formed of flexible plastic material so that the knobs can be disengaged from the recesses and engaged therein by flexing the arms.

3. A dental articulator, comprising mandibular and maxillary stones each composed of rigid, set material, at least one of said stones having a tapered passage extending therethrough from one side of the other thereof for removably receiving a model of an artificial tooth, a first articulator joint member secured in one end of one of the stones, a second articulator joint member secured in one end of the other of said stones, the first joint member having a pair of straight parallel arms extending upwardly from the one stone with spherically curved knobs extending toward each other in axial alignment on opposing inner sides of the arms respectively, the second joint member having another pair of straight parallel arms extending downwardly from the other stone, said other arms having first recesses on outer sides thereof rotatably receiving the respective knobs, said other arms having other recesses concentric with the first recesses and shallower than the first recesses to engage the knobs when the stones are turned and twisted with respect to each other to simulate anatomical bite movements, each of the joint members being generally U-shaped with a straight bight joining the arms thereof and with a flat tang integral with the bight, the bights of the joint members bearing on the stones respectively and the tangs of the joint members being embedded in the stones respectively.

4. A dental articulator joint comprising a pair of generally U-shaped joint members, each of said joint membes having a pair of parallel arms connected by a bight, a tang extending outwardly of the bight away from the arms, and ribs on the arms to strengthen the same, the arms of one joint member having aligned knobs formed near ends of inner opposing sides thereof, the arms of the other joint member having recesses on outer sides thereof rotatably receiving the knobs of the one joint member so that the joint members are pivotable with respect to each other through an angle of at least 90°.

5. A dental articulator, comprising a mandible portion and a maxilla portion, each of the portions being composed of rigid, set, molded stone, first and second articulator joint members secured at ends of the respective portions, the first joint member having a pair of straight parallel arms extending upwardly from the mandible portion with spherically curved knobs extending toward each other in axial alignment on opposing inner sides of the arms respectively, the second joint member having another pair of straight parallel arms extending downwardly from the maxilla portion, said other arms having recesses on outer sides thereof rotatably receiving the respective knobs so that the said portions are rotatable with respect to each other through an angle of at least 90°, the arms of the joint members being formed of flexible plastic material, said other arms having other recesses concentric with the first-named recesses, larger in diameter than the first-named recesses, and of less depth than the first-named recesses, so that the knobs slip initially into the other recesses when said portions are slightly twisted to simulate anatomical bite movements, and the knobs slip out of the first-named recesses when said portions are further twisted.

6. A dental articulator joint comprising a pair of generally U-shaped joint members, each of said joint members having a pair of parallel arms connected by a bight, a tang extending outwardly of the bight away from the arms, and ribs on the arms to strengthen the same, the arms of one joint member having aligned knobs formed near ends of inner opposing sides thereof, the arms of the other joint member having recesses on outer sides thereof rotatably receiving the knobs of the one joint member so that the joint members are pivotable with respect to each other through an angle of at least 90°, each of the tangs being formed with notches in outer edges thereof for engaging moldable material of an articulator stone.

7. A dental articulator joint comprising a pair of generally U-shaped joint members, each of said joint members having a pair of parallel arms connected by a bight, a tang extending outwardly of the bight away from the arms, and ribs on the arms to strengthen the same, the arms of one joint member having aligned knobs formed near ends of inner opposing sides thereof, the arms of the other joint member having recesses on outer sides thereof rotatably receiving the knobs of the one joint member so that the joint members are pivotable with respect to each other through an angle of at least 90°, each of said joint members being formed of flexible, plastic material so that the knobs are disengageable from the recesses and are engageable in the recesses by slightly flexing the arms of the joint members.

8. A dental articulator joint comprising a pair of generally U-shaped joint members, each of said joint members having a pair of parallel arms connected by a bight, a tang extending outwardly of the bight away from the arms, and ribs on the arms to strengthen the same, the arms of one joint member having aligned knobs formed near ends of inner opposing sides thereof, the arms of the other joint member having recesses on outer sides thereof rotatably receiving the knobs of the one joint member so that the joint members are pivotable with respect to each other through an angle of at least 90°, the arms of the other joint member having other recesses concentric with the first-named recesses and larger in diameter than the first-named recesses to receive the knobs when the joint members are slightly twisted to disengage the knobs from the first-named recesses.

References Cited in the file of this patent
UNITED STATES PATENTS

| | | |
|---|---|---|
| 766,235 | Fleming | Aug. 2, 1904 |
| 1,045,586 | Montague | Nov. 26, 1912 |
| 2,005,114 | Spitzer et al. | June 18, 1935 |
| 3,031,759 | Heintz et al. | May 1, 1962 |

FOREIGN PATENTS

| | | |
|---|---|---|
| 57,981 | France | Sept. 18, 1953 |
| 292,110 | Italy | Jan. 5, 1932 |